United States Patent [19]
Meisner et al.
[11] 3,974,014
[45] Aug. 10, 1976

[54] METHOD FOR TRANSFERRING DESIGN IMAGE TO WAX ARTICLES

[75] Inventors: Merlin M. Meisner; Raymond M. Matulis; James R. Mackey, all of Overland Park, Kans.

[73] Assignee: Hallmark Cards, Incorporated, Kansas City, Mo.

[22] Filed: July 10, 1974

[21] Appl. No.: 486,820

[52] U.S. Cl. .......... 156/240; 101/470; 106/26; 106/31; 156/277; 156/322; 260/17 R; 427/148; 427/152; 427/316; 427/416; 428/914; 431/126; 431/288

[51] Int. Cl.$^2$ .......... B32B 01/08; B41M 01/10; B41M 03/12; C11C 05/00

[58] Field of Search .......... 156/230, 240, 239, 277, 156/311, 322; 431/126, 288, 289; 260/17 R; 428/914, 486, 487; 101/150, 170, 470; 427/148, 152, 261, 416, 270, 316; 106/26, 31

[56] References Cited

UNITED STATES PATENTS

| | | | |
|---|---|---|---|
| 2,667,003 | 1/1954 | Von Hofe | 156/540 |
| 2,746,877 | 5/1956 | Matthes | 156/230 |
| 2,841,972 | 7/1958 | Weglin | 431/126 X |
| 2,862,832 | 12/1958 | Shepherd, Jr. | 161/235 UX |
| 3,298,850 | 1/1967 | Reed et al. | 156/230 X |
| 3,510,341 | 5/1970 | Peck et al. | 156/230 X |
| 3,519,456 | 7/1970 | Reed et al. | 156/240 X |
| 3,615,992 | 10/1971 | Jeffries et al. | 156/230 X |
| 3,616,015 | 10/1971 | Kingston | 156/230 |
| 3,839,119 | 10/1974 | Solomon | 431/126 X |

*Primary Examiner*—Douglas J. Drummond
*Assistant Examiner*—Thomas Bokan
*Attorney, Agent, or Firm*—Schmidt, Johnson, Hovey & Williams

[57] ABSTRACT

A simplified, low-cost method and apparatus for transferring inked design images from preprinted, design bearing waxed sheets to elongated, cylindrical, solid wax candle bodies or the like which permits gravure or lithographically applied halftone and shaded design images to be used as candle decorations, eliminates costly and tedious manual operations characteristic of decal applications and other prior methods and devices, and produces a finished candle having perfectly aligned decorative images thereon which are not susceptible to undesirable torching as the candle burns. The method comprises applying a design-bearing, waxed sheet to the candle body in closely conforming relationship thereto while the latter rotates in pressurized, bridging engagement between a pair of spaced, adjacent, rotating transfer rollers. Heat is applied to the sheet through one transfer roller to thereby effect transfer and partial wax encapsulation of the design image on the candle body, whereupon the transfer sheet is stripped from the candle and discarded. Means are also provided for sequentially heat treating separate candles to remove surface irregularities thereon, followed by water-cooling and air drying thereof prior to the image transfer step. Novel ink formulations are also disclosed which are especially adapted for gravure printing of design images onto waxed substrates without smearing or offsetting thereof, and which facilitate ultimate transfer to solid candle bodies.

14 Claims, 11 Drawing Figures

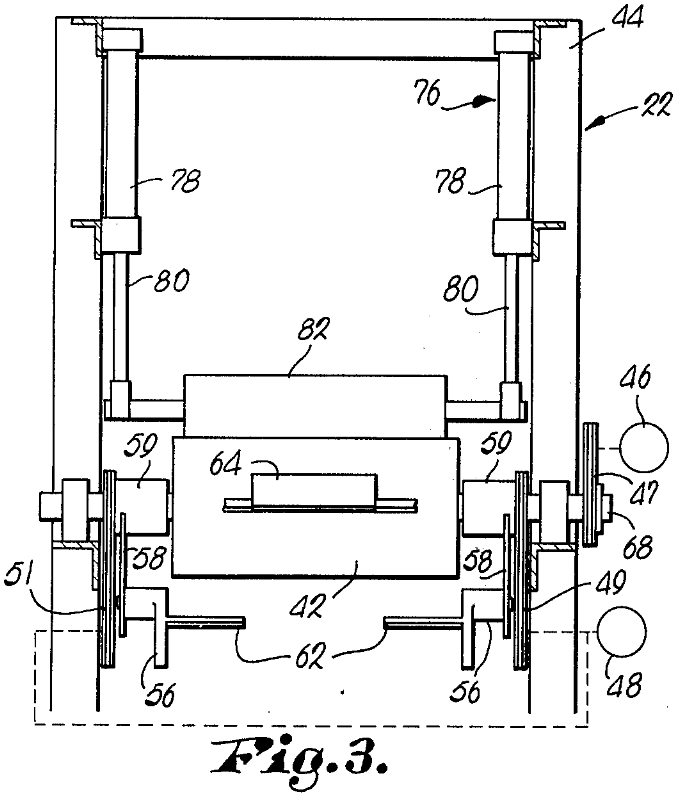
Fig.3.
Fig.4.
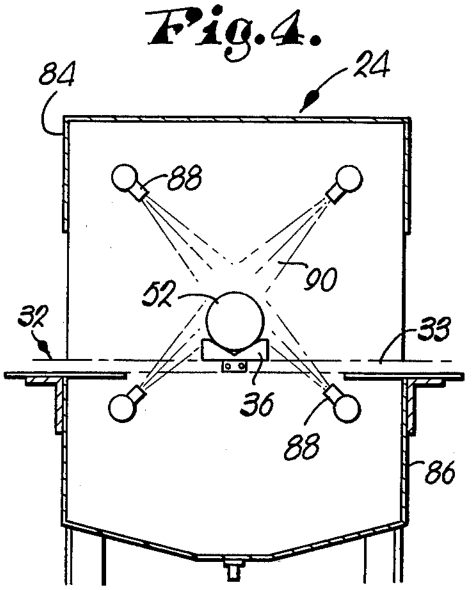
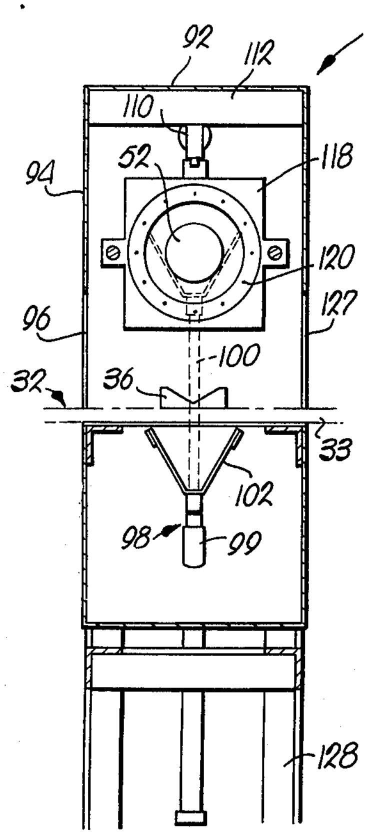
Fig.5.
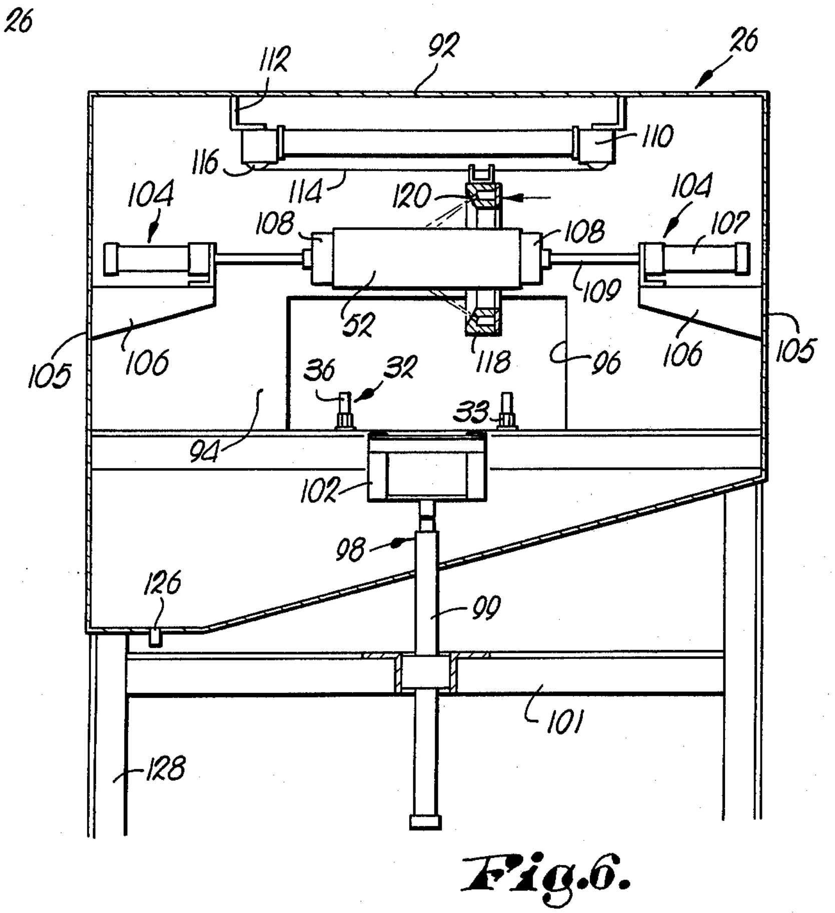
Fig.6.

Fig.7.
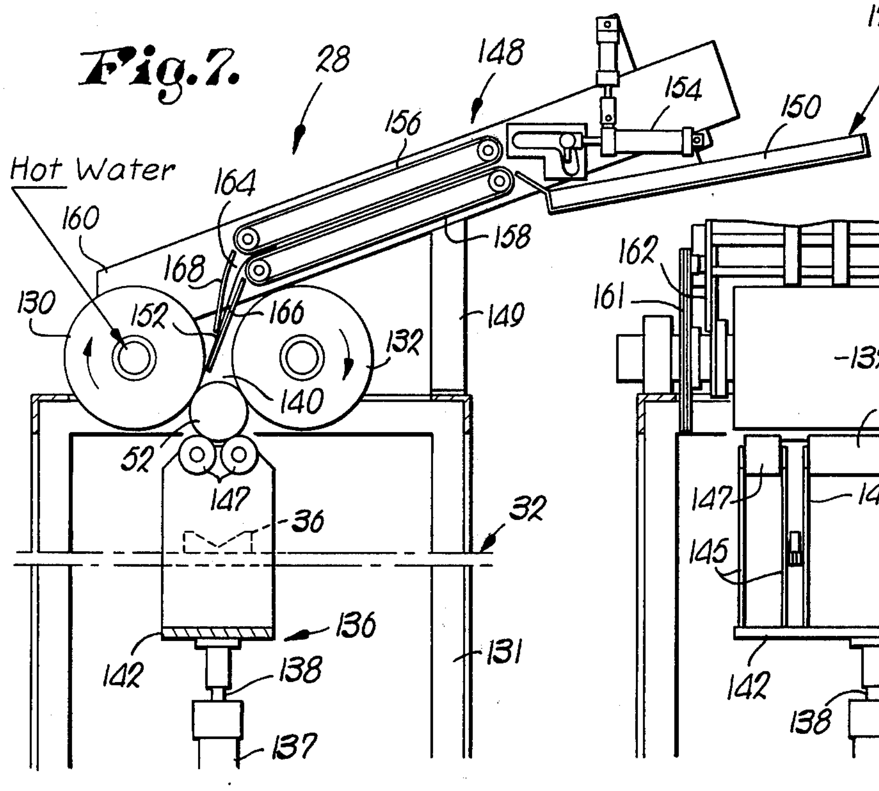
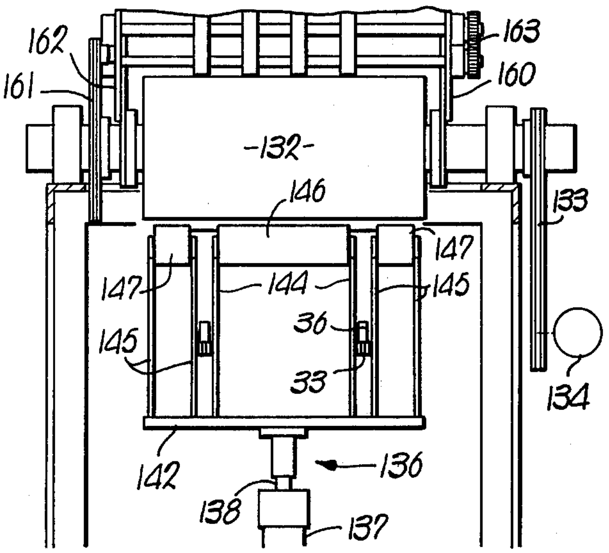
Fig.8.
Fig.9.
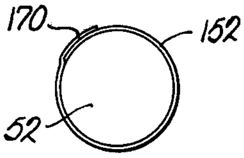
Fig.10.
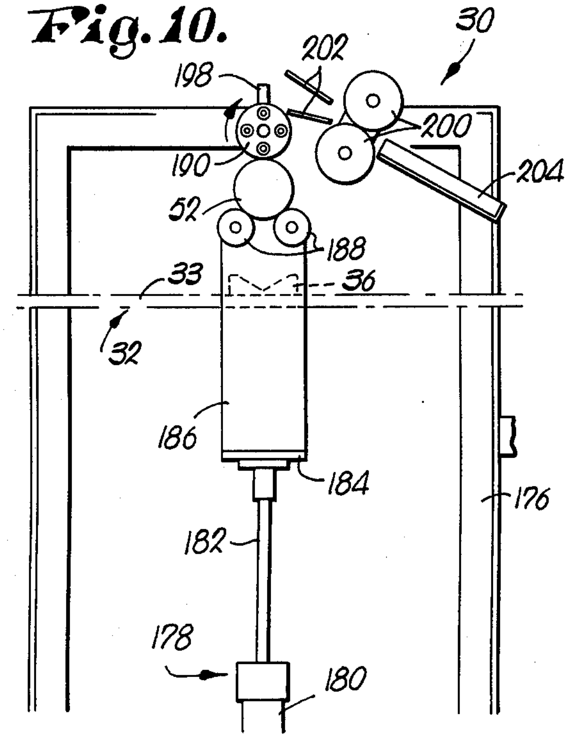
Fig.11.
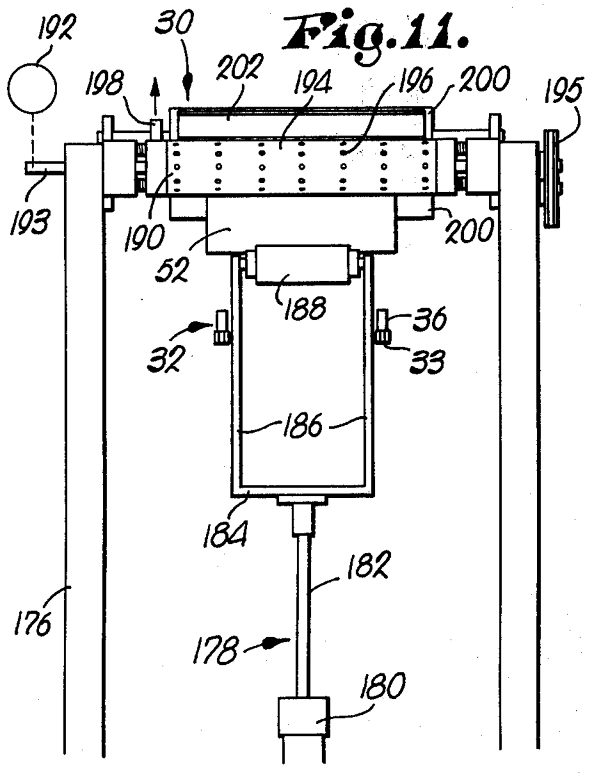

METHOD FOR TRANSFERRING DESIGN IMAGE TO WAX ARTICLES

This invention relates to a method and apparatus for transferring ink design images from initially flat, preprinted waxed sheets onto solid wax articles such as elongated, cylidrical candle bodies. More particularly, it is concerned with a continuous, commercially advantageous method and to apparatus for decorating solid wax candles with desirable halftone or shaded design images without resort to costly and tedious prior methods such as hand-painting thereof or application of decals or the like to the candle surface. The unique processing steps of the transfer method permit the waxed sheets to be printed by gravure or lithographic methods thus yielding significant economics of production and facilitating printing of the shaded images. Novel ink formulations are preferably used which are especially adapted for gravure printing of design images onto waxed paper sheets thus assuring complete image transfer to solid wax candle bodies without smearing or ink offset.

In the art of decorating solid wax articles such as elongated candle bodies, there has been a longfelt need for a commercially acceptable method of decorating such articles with multicolor halftone or shaded designs. One of the problems heretofore encountered in efforts to use gravure or lithographic techniques for printing such decorations directly onto candles has been the fact that candle wax is quite easily rendered relatively soft and pliable and tends to be deformed by the printing medium. Moreover, candle wax will generally not retain an ink film on the surface thereof with any degree of tenacity, which results in a problem known in the printing art as "picking". This refers to the tendency of the ink applied to a candle body to lift from the surface thereof and smear during printing operations. Another troublesome problem encountered in attempts to print directly onto candles is the lack of complete and precise dimensional uniformity from one candle to another. Slight variations in size and shape make it impossible to maintain proper register while printing with precision halftone printing equipment heretofore available for printing onto arcuate surfaces. Furthermore, such equipment is extremely costly and requires skilled workmen to operate, which of course further detracts from the commercial feasibility of printing halftone design images directly onto solid wax candle bodies.

Another previously unsolved problem associated with printing onto wax surfaces in general involved the lack of availability of inks which could satisfactorily be used for such work. Specifically, inks normally used for decorative candle images generally contained nitrocellulose and chlorinated rubber constituents which consequently required special solvents such as aliphatic hydrocarbons and aromatic species. The latter were found to solubilize candle wax to an extent such that during printing, wet ink comingled with the solubilized wax and even became partially encapsulated therein while still wet. This caused problems of smearing and also retarded the drying of the ink, both of which were troublesome aspects. Furthermore, the adherence characteristic of these prior inks was limited when used to imprint design images on wax surfaces.

A number of other attempts have been made in the past to provide a method of decorating candle bodies with desirable halftone images. For example, conventional multicolor silk screening processes have been tried, but these methods were objectionable because of the complexity involved in successively printing on the candle bodies with different colors; moreover, silk screening methods are generally limited to bold linework designs and are not easily adaptable to produce desirable shaded or halftone images. The sophisticated precision techniques available for silk screening halftone images are very prone to produce strong moire patterns, have poor tonal ranges, and the detail which can be obtained in the resultant silk screened halftones is generally poor. Consequently, silk screening techniques have found only limited acceptance in the art of candle decoration.

Hand-applied decals are currently being used to decorate many candles with halftone images. In this technique, a thin film of carrier material, such as ethylene vinyl acetate copolymer is first deposited upon a specially prepared release paper. A halftone image is then imprinted on the film using conventional graphic arts techniques. The image bearing film is then released from its carrier and wrapped about the candle to be decorated. While this process permits preparation of candles having desirable halftone images thereon, it nevertheless has disadvantages in that a structurally distinct, self-supporting film is wrapped about the candle which can remain freestanding as the candle burns. As can be appreciated, this may present a serious problem of "torching", or separate burning of the externally applied decal as a secondary wick when the candle burns. Additionally, in order to attain the proper register with such decals, a great amount of costly hand labor is normally required; such decals can quite easily become longitudinally misaligned and distorted on the candle body if great care is not taken during application thereof.

Other methods for decorating candle bodies with halftone images have also been suggested, including that disclosed in the U.S. Pat. No. 2,122,451 of Cassimatis. This patent teaches that candles can be decorated by inserting a preprinted insert into the candle mold and then stripping away the insert after liquid candle wax has been deposited in the mold and allowed to solidify. The main defect with this technique of candle decoration is that it is rather difficult to properly position the insert within the candle mold and maintain the same in required register therein after molten wax has been poured into the cavity.

In practice, it has also been found that the insert sometimes distorts or falls toward the center of the mold and becomes partially embedded in the wax. As a result, the insert is then very difficult to remove without defacing and thereby ruining the candle. It will also be appreciated that the techniques disclosed in U.S. Pat. No. 2,122,451 are not adapted for automated operations and therefore the methods thereof are unacceptable for efficient commercial operations.

Thus, it will be seen that a number of related and heretofore unsolved problems have militated against attempts to economically decorate solid wax candle bodies with halftone or shaded design images, which consequently necessitated hand decorating of the candles or resort to other costly and time-consuming techniques.

As a consequence, there is a need in the art for an improved, commerically feasible method and apparatus for transferring inked halftone design images to solid wax bodies such as candles, which minimizes the need of manual handling and operations, permits gravure or lithographically applied halftone or shaded images to be utilized, and produces substantially perfectly aligned decorations on the candles which initially may or may not be of perfectly cylindrical configuration. Furthermore, there is a need for improved ink formulations which permit printing onto waxed surfaces with good adherence and proper drying characteristics.

It is therefore the most important object of the present invention to provide a method of transferring halftone and shaded design images onto solid wax candles or the like which is susceptible to essentially complete automation, permits the use of economical high-speed gravure and lithographic printing techniques and consequently does not require specialized precision printing equipment, and which produces finished decorated candles without freestanding, structurally distinct decals or the like about the surface thereof that could result in dangerous torching of the decal as the candle burns.

Another object of the present invention is to provide a method and apparatus of the characteristics described wherein the method comprises the steps of providing a waxed transfer sheet bearing a design image thereon imprinted by conventional gravure or lithographic techniques, followed by wrapping the imprinted sheet about the candle body in closely conforming relationship thereto with the design image facing the article, while simultaneously applying heat and pressure to the sheet to effect transfer of the design image to the wax article. Heat and pressure transfer of the design image in this manner partially encapsulates the latter in wax on the surface of the candle body which permits even burning of the image as the candle burns, and ensures that the image is substantially resistant to scuffing or smearing.

As a corollary to the foregoing, it is also an object of the invention to provide a method wherein initially flat waxed glassine paper sheets are imprinted by gravure techniques with halftone design images, and wherein the ink employed in the gravure printing step utilizes solvents incapable of significantly solubilizing the wax surface of the sheet and which is characterized by remaining sufficiently fluid during gravure printing to permit image transfer to the waxed paper sheet, but is sufficiently quick drying to preclude offsetting between successively imprinted sheets. In particular, the ink formulations hereof comprise a pigment, an alcohol insoluble maleic ester resin binder, hard modified microcrystalline wax, cellulose ether ester as a viscosity controlling agent, and a solvent capable of solubilizing the resin binder and viscosity agents, but which does not significantly solubilize the wax on the wax bearing sheet.

Yet another object of the invention is to provide a method of transferring a design image to wax candle bodies which further includes the steps of heat-treating the candle bodies to remove surface irregularities thereon and true the candles so that they are cylindrical within tolerance limits, followed by spraying the bodies with cooling water to effect complete rehardening of the surface thereof, with air-drying to strip substantially all of the water from the candle bodies, whereupon image transfer is facilitated by virtue of the fact that the candle bodies are substantially of uniform dimensions with no significant surface irregularities thereon.

In the drawings:

FIG. 3 is an essentially schematic, fragmentary end elevational view of the finishing station shown in FIG. 2 and illustrating the common carrier in cross section;

FIG. 4 is a fragmentary, schematic end view of the cooling station illustrated in FIG. 1, shown with a series of water jets for spraying cooling water onto a candle body;

FIG. 5 is a fragmentary, schematic, side elevational view depicting the details of the drying station shown in FIG. 1, with the extent of movement of the pneumatically actuated lift mechanism thereof being shown in phantom;

FIG. 6 is a fragmentary, schematic, side elevational view of the drying station shown in FIG. 5, illustrated with a candle body held in position by opposed, reciprocable holding rams, and embodying slidable air-drying means for directing air onto the surface of the candle body to strip moisture therefrom;

FIG. 7 is a fragmentary, schematic, side elevational view of the design image transfer station shown in FIG. 1, illustrated with a candle body in pressurized, bridging engagement with the respective transfer rolls thereof, and with a design-bearing, waxed sheet entering the nip between the candle body and one of the transfer rolls;

FIG. 8 is a fragmentary, end elevational view of the transfer station depicted in FIG. 7;

FIG. 9 is an end elevational view of an elongated, cylindrical candle body having a waxed image bearing transfer sheet wrapped thereabout in closely conforming relationship thereto with an elongated, trailing tab portion overlapping the leading edge of the transfer sheet in contact with the candle body;

Figure 1:
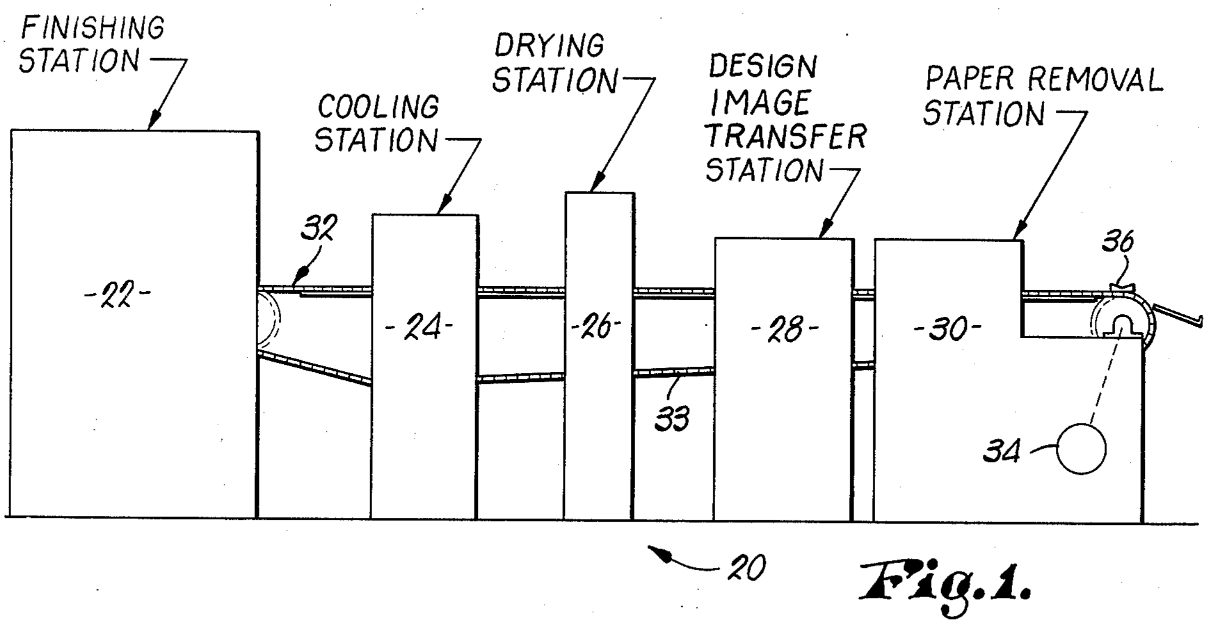
FIG. 1 is a schematic representation of a preferred embodiment of apparatus for transferring design images to solid wax articles from preprinted, design bearing waxed sheets.

FIG. 10 is a fragmentary, schematic, side elevational representation of the vacuum actuated transfer sheet stripping means forming a part of the paper removal station of FIG. 1 and shown with the elongated, resilient vacuum roller thereof in engagement with the candle body prior to removal of the transfer sheet therefrom; and FIG. 11 is a fragmentary, schematic end elevational view of the paper removal station illustrated in FIG. 10.

Referring now to the drawings, an overall schematic representation of a multi-station, in line device 20 for transferring design images onto solid wax candle bodies is depicted in FIG. 1. Device 20 includes a finishing station 22, cooling station 24, drying station 26, design image transfer station 28, and finally, a paper removal station 30. All of the respective stations are preferably positioned in spaced, in-line disposition for continuous operation and have an endless conveyor 32 in the form of identical, spaced endless chains 33 for delivering candle bodies to the various stations. Conveyor 32 is conventional in nature and the chains thereof are driven in synchronism by motor 34, shown schematically in FIG. 1. Each of the chains 33 also includes matched pairs of spaced, upright, horizontally aligned, generally V-shaped candle supporting cradles 36.

Figure 2:
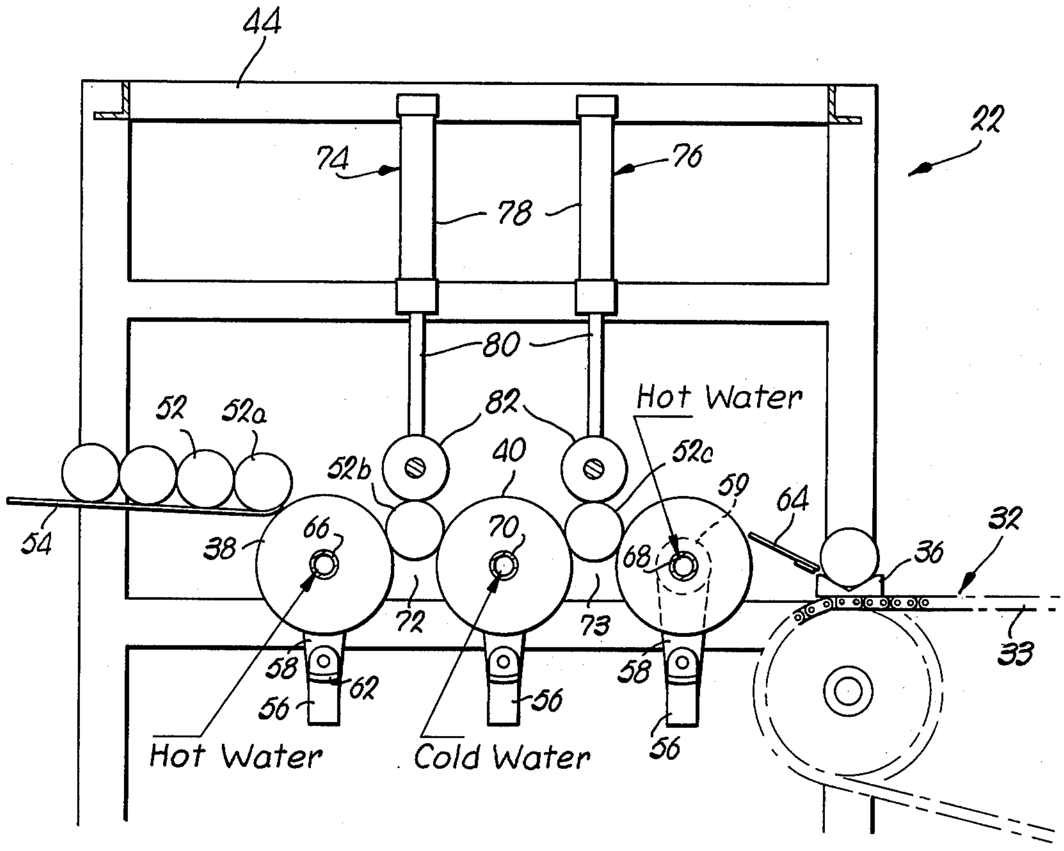
FIG. 2 is an essentially schematic, fragmentary side elevational view showing certain details of the finishing station depicted in FIG. 1.

Finishing station 22 which is detailed in FIGS. 2 and 3 includes an array of three elongated, cylindrical rollers 38, 40 and 42 rotatably journaled on supporting frame structure 44. Each of the respective rollers 38, 40 and 42 is disposed in spaced, adjacent, parallel, side-by-side relationship and all of the rollers are axially rotated in unison in the same direction by means of schematically represented motor 46 (FIG. 3) which drives the respective rollers through conventional chain and sprocket mechanism 47 interconnecting the same with motor 46. Additionally, the rollers of adjacent pairs thereof within the array are spaced apart a distance such that an elongated candle body 52 can be placed between the adjacent rollers in pressurized, bridging contact therewith to be rotated axially thereby as the latter rotate in unison.

An inclined delivery ramp 54 is provided adjacent the left-hand end of the roller array for delivering a supply of elongated, cylindrical candle bodies 52 to finishing station 22. Each roller within the array is also provided with a pair of spaced, opposed, radially extending rotatable pickup carriages 56 associated therewith which rotate coaxially with the roller therebetween through radial linkages 58. Referring specifically to FIG. 3, it will be seen that linkages 58 are rotatable about an axis coindicent with the axis of rotation of the respective rollers 38, 40 or 42, and are attached to the axle structure thereof by means of separate collars 59. Each collar 59 is rotatably mounted on respective concentric axle structures and the opposed pairs of collars are driven in unison independently of the finishing rollers by means of schematically represented conventional motive means 48 acting through appropriate sprocket and chain mechanisms 49 and 51 which are interconnected through conventional linkage structure coupled with motive means 48. Carriages 56 include opposed, inwardly extending, tranversely arcuate, elongated pickup tongues 62 which are configured to cooperatively engage and pick up candle bodies 52 and move the same from ramp 54 and into bridging contact between rollers 38 and 40, and thence into bridging contact with rollers 40 and 42, and finally to discharge ramp 64, whereupon the candles seat upon V-shaped cradles 36 situated on endless chains 33 for this purpose. It will be appreciated that carriages 56 will normally be rotated intermittently in timed relationship relative rollers 38, 40 and 42 in order to permit the latter to adequately reform and true the candle bodies 52 and remove any surface irregularities thereon prior to discharge thereof from finishing station 22.

The initial roller 38, along with terminal roller 42, are hollow and have tubular inlet means 66 and 68 respectively for entrance of hot water into the interior thereof. In practice, it has been found particularly advantageous to supply heating water to roller 38 such that the latter is of a temperature approximating 175° F., while roller 42 is similarly heated to a temperature of about 135° F. In contradistinction thereto, central hollow roller 40 has cold water inlet means 70 for permitting maintainance of this roller at a temperature of about 75° F. Thus, when the candle bodies 52 are seated in the bridging areas 72 and 73 between adjacent pairs of rollers, the heated rollers thereof act to partially soften and render maleable the surface of the candle bodies 52. As rotation thereof continues, the partially softened surface areas are rehardened to a limited extent during contact with the adjacent cold roller. In this fashion a cylindrical body configuration is assured and any surface irregularities of the candle bodies 52 are effectively removed by the successive rotative heat treatment afforded by the adjacent pairs of hot and cold, continuously moving rollers within finishing station 22. In this respect it is to be noted that candle bodies 52 can be oval, egg-shaped or elliptical within limits, provided that the outer candle surfaces are substantially straight and parallel with the longitudinal axis of the candles. Thus perfectly cylindrical candle bodies 52 are not an absolute requirement for continued treatment in accordance with the methods hereof.

The reforming effects alluded to above are enhanced by the provision of cooperatively spaced pairs of pneumatically actuated pressure rams 74 and 76 which depend from frame structure 44. As shown in FIGS. 2 and 3, each of the four identical rams includes an air cylinder 78, and a concentric, extensible piston and rod 80 extending downwardly therefrom. Elongated, cylindrical, freely rotatable pressure rollers 82 are attached between ram pairs 74 and 76 at the ends of the respective rods 80 thereof and in longitudinal alignment with the space between adjacent pairs of rollers 38, 40 and 42. Each pressure roller 82 is disposed for contact with a respective candle body 52 when the latter is in position within a corresponding finishing area 72 or 73.

It will be appreciated that during operation of finishing station 22, a candle body 52 is first lifted from supply ramp 54 by the pickup carriages 56 associated with roller 38 and carried to finishing area 72 between rollers 38 and 40. At this point, the rams of ram pair 74 are simultaneously extended to bring pressure roller 82 connected therebetween into engagement with candle body 52 at a point thereon remote from the underlying rollers. Simultaneously with this action, the continued rotation of rollers 38 and 40 along with the temperature differential therebetween sequentially softens and renders maleable the surface wax of candle body 52 and reforms the same in order to true the candle body and remove any surface irregularities thereon. Following this initial rotative treatment, roller 82 is elevated and the carriages 56 associated with central roller 40 operate to pick up candle body 52 from area 72 and deliver the same to adjacent finishing area 73 between rollers 40 and 42. At this point, the rams of ram pair 76 are extended such that pressure roller 82 connected therebetween contacts candle body 52 in a manner similar to that previously described with reference to finishing area 72. Accordingly, a secondary finishing operation occurs in area 73 by virtue of the rotation of rollers 40 and 42 and the temperature difference therebetween. Finally, carriages 56 rotatably associated with roller 42 pick up candle body 52 and deliver the same to ramp 64, whereupon the candle is free to roll downwardly under the influence of gravity and be picked up by one of the cradles 36 on conveyor 32. Thus, it will be seen that a totally automated operation is provided for finishing elongated candle bodies 52 without the need for any manual operations whatsoever. It is also to be appreciated that all of the candle pickup carriages 56 operate in intermittent synchronism so that as a body **52*a* is picked up from the supply thereof on ramp 54, the first treated candle body 52*b* is simultaneously shifted from station 72 to adjacent station 73 and the candle body 52*c* at the last finishing station 73 is transferred to cradles 36 of conveyor 32** positioned in proximal relationship thereto.

Upon exiting from finishing station 22, the respective candle bodies are delivered to conveyor 32 and may still have somewhat warm and yieldable surface areas.

Accordingly, it is preferable to completely cool the bodies 52 in order to ensure that the same are not deformed during further processing. In this connection, cooling station 24 provided adjacent finishing station 22 may include an upper housing section 84 which is disposed above conveyor 32, and a lower housing collector section 86 beneath conveyor 32. Four separate inwardly directed water nozzle banks 88 are positioned within the housing sections and are disposed to spray separate streams of cooling water 90 toward each other onto candle body 52 within the housing. Excess water from the nozzle banks 88 is then collected in lower housing collector 86 for ease of removal or reuse. In practice, the temperature of water streams 90 is not a critical factor, but need be only sufficient to assure complete hardening of the somewhat pliable outer surface of candle bodies 52.

Upon leaving cooling station 24 on conveyor 32, candle bodies 52 (which are still carried by spaced cradles 36 provided on the spaced endless chains 33) enter drying station 26, shown FIGS. 5 and 6. Station 26 includes a housing 92 having a vertical planar front wall 94 and an entryway 96 therein through which conveyor 32 travels. After each candle body 52 enters housing 92, intermittently operable conveyor 32 is stopped, which permits pneumatically actuated lift mechanism 98 to be raised which in turn elevates candle body 52 to the upper part of housing 92. As best shown in FIG. 5, mechanism 98 includes a cylinder assembly 99 vertically oriented and supported on beam 100 and having an extensible rod 100 therein with a generally Y-shaped support 102 at the upper end thereof. As depicted in phantom in FIG. 5, rod 100 is extended to move upwardly between spaced endless chains 33 which causes support 102 to pick up a candle body 52 resting on spaced cradles 36. When rod 100 is elevated to the maximum extent, candle body 52 is positioned adjacent identical, opposed, pneumatically actuated holding rams 104 which are attached to the opposed sidewalls 105 of housing 92 by means of brace structure 106. Each ram 104 includes a cylinder 107 with an extensible rod 109 therein having a resilient candle-holding pad 108 on the end thereof. When fully extended, the pads 108 on rods 109 of holding rams 104 engage the circular end faces of candle body 52 to suspend the same above conveyor 32. Ram 100 can then be lowered to its original position as shown in FIG. 6, prior to the air-drying treatment of candle body 52.

An elongated weldment track 110 is attached to the top wall of housing 92 by means of spaced brackets 112 and supports an endless cable 114 with spaced drive wheels 116 for moving the latter. Air-drying means 118 is suspended from cable 114 and is movable therewith along the length of candle body 52. Drying means 118 includes upright dryer ring having an air passage thereon leading to a plurality of spaced air orifices 120 therein positioned to direct separate airstreams onto candle body 52 as means 118 is moved longitudinally of the candle. The air outlet orifices are oriented as depicted in FIG. 6 to direct air blasts against the candle body at an angle relative to the cylindrical surface thereof to facilitate stripping of water from the outer face thereof.

Housing 92 also includes an inclined bottom wall 122 which facilitates collection of water stripped from candle body 52 during operation of the air-drying means 118. Such water collects in the lowermost sections 124 of housing 92 and can drain via discharge 126. Upon return of the dried candle body to the supports 36 therebelow, the conveyor 33 is reactuated to send the candle to the next station through the outlet opening 127 of housing 92.

It will be appreciated from the foregoing that a series of elongated candle bodies 52 can be finished on a continuous basis to true the surfaces thereof and effect removal of surface imperfections thereon, followed by complete hardening and drying of the same through the use of the apparatus heretofore described. Furthermore, it is apparent that the method is completely automated and requires little attention from the operator.

The next section of apparatus 20 is transfer station 28, depicted in detail in FIGS. 7 and 8. Transfer station 28 includes a pair of identical, spaced, adjacent transfer rollers 130 and 132 which are rotatably positioned in aligned, side-by-side relationship on conventional support structure 131 above conveyor 32. Schematically represented motor means 134 carried by structure 131 and is operable through sprocket and chain assembly 133 to rotatably drive rollers 130 and 132 in unison in the same direction. Reciprocal pick-up means 136 below conveyor 32 includes a vertically oriented pneumatic cylinder 137 having an extensible rod 138 therein and a horizontal base plate 142 on the outer end thereof. Pickup means 136 supported by rod 138 is adapted to raise the candle body 52 located thereabove from conveyor 32 and to press the same into rotative, bridging engagement with transfer rollers 130 and 132 in the area 140 therebetween.

As best shown in FIG. 8, the pick-up means 136 is provided with a horizontally disposed, planar baseplate 142 having a pair of spaced, upstanding planar central extensions 144 connected thereto adjacent the insides of spaced chains 33. Two pairs of upstanding, roller supporting extensions 145 are also connected to baseplate 142, with each of the respective pairs 145 being positioned adjacent the spaced chains 33 on the outside thereof in alignment with extensions 144. A pair of spaced, transversely extending freely rotatable pressure rollers 146 are provided at the upper ends of extentions 144 for picking up a candle body 52 and to press the same into engagement with rollers 130 and 132 in the area 140 therebetween. Similarly, two pairs of spaced end pressure rollers 147 are provided at the upper ends of separate extension pairs 145 for the same purpose.

Sheet delivery means 148 is positioned above rollers 130 and 132 and is supported by struts 149 extending upwardly from structure 131. Delivery means 148 includes a holding tray 150 for holding a plurality of preprinted, design-bearing waxed sheets 152. One feature of the present invention is the fact that the process lends itself to lithographic application of the design image to the wax paper using existing printing equipment such as gravure printing presses. Pneumatically actuated sucker-feeder mechanism 154 is positioned adjacent tray 150 in disposition to successively pick up single sheets 152 and deliver the same to the nip presented between inclined, adjacent, oppositely driven upper and lower endless delivery belts 156 and 158 which are rotatably journaled between inclined sideplates 160 and 162 and driven by motor 134 through sprocket and chain mechanism 161. The belts 156 and 158 are driven oppositely by provision of conventional gear mechanism 163 provided on the ends of the lower adjacent mounting rollers therefor opposite mechanism 161. The respective belts 156 and 158 frictionally engage the successive sheets 152 and deliver the same to the end of the belts remote from tray 150 and into delivery channel 164. Channel 164 is composed of an inclined slide 166 with flexible retainer 168 thereabove. As shown in FIG. 7, each sheet 152 is delivered between slide 166 and retainer 168 whereupon the sheets are then guided into the nip defined by left-hand transfer roller 130 and candle body 52. Accordingly, as the transfer rollers 130 and 132 rotate in the clockwise direction indicated, each sheet 152 is progressively wound about a corresponding candle body 52 in closely conforming relationship thereto. This tight wrapping is facilitated by virtue of the pressure applied through carriage means 136 which engages candle 52 in the manner depicted.

In preferred forms, the sheets 152 are each of a length somewhat greater than the circumference of candle body 52. Refering specifically to FIG. 9, it will be seen that a typical sheet 152 is of length to provide an elongated, trailing tab section 170 which overlaps the initial edge of sheet 152 in contact with candle body 52. This tab portion 170 facilitates stripping of sheet 152 from candle body 52 in a manner to be described hereinafter.

Hot water inlet means 172 is also provided for transfer roller 130 in order to heat the latter to a temperature of approximately 125° F. Although roller 132 can likewise be provided with temperature control means, in practical applications it has been discovered that this roller can simply be left at room temperature to good advantage. It will be appreciated that as a sheet 152 is progressively wrapped about candle body 52, both heat and pressure are applied thereto because of the heated water within transfer roller 130 and the pressure applied by pick-up means 136. This consequently causes the inked design image printed on waxed sheet 152 to be transferred to candle body 52. In this connection, it has been found that the inked image on sheet 152 is essentially completely transferred to candle body 52 and is at least partially encapsulated between the waxed surface of candle body 52 and the wax initially on sheet 152. Accordingly, it will be apparent that the resultant decorated candle is extremely scuff-proof and resistant to design smearing.

As alluded to previously, it has been found during the development of the present invention that waxed transfer sheets 152 can most economically be preprinted with desired design images by means of conventional gravure printing, assuming that proper ink formulations are employed. One feature of the present invention resides in the discovery that certain types of ink formulations are particularly adapted for printing onto waxed substrates such as glassine paper coated with wax. For illustrative purposes however, a gravure press 174 is depicted schematically in FIG. 7 to indicate the step of preprinting the waxed sheets 152 prior to design transfer onto candle bodies 52 in accordance with the preferred method hereof. It is to be noted in this respect that the gravure printing techniques referred to herein are conventional in the art and a detailed discussion of these processes is therefore unnecessary. Other lithographic processes applicable in the present process include letter press and offset type printing, and these methods can also be employed so long as the design image firmly adheres to the waxed surface of the paper sheet without offset thereof.

Following the design transfer step of the present method, each candle body 52 having a sheet 152 wrapped thereabout, are shifted out of contact with transfer rollers 130 and 132 by lowering rod 138 of pick-up means 136, whereupon the body again rests on spaced cradles 36 therefor. At this point, conveyor 32 is advanced to move body 52 into paper removal station 30.

Referring specifically to FIGS. 10 and 11, it will be seen that paper removal station 30 consists of upstanding frame structure 176 supporting reciprocable pick-up structure 178 mounted therein. Structure 178 consists of a pneumatic cylinder 180 provided with an elongated, coaxial reciprocable rod 182 extending therefrom and having transverse base structure 184 at the outermost end of rod 182. A pair of planar, upright extensions 186 are attached to base structure 184 and have a pair of freely rotatable, candle-engaging rollers 188 attached thereto at the upper end of the same.

A rotatable vacuum roller 190 is mounted above conveyor 32 on frame structure 176 and is selectively rotatably by means of schematically represented motor 192 connected thereto through drive axle 193. Roller 190 is covered with a resilient, rubber-like blanket 194 which has a plurality of vacuum apertures 196 therein. A vacuum fitting 198 is provided on the mounting for roller 190 which communicates with the interior of the latter to permit a vacuum to be drawn through the roller 190 and circumscribing blanket 194 by means of a standard vacuum pump (not shown).

Paper removal station 30 is completed by provision of a pair of adjacent pickup rollers 200 which are driven by motor 192 through chain and sprocket assembly 195 and positioned proximal to vacuum roller 190 in position to pick up waxed transfer sheets 152 as they are stripped from candle bodies 52. In this connection, a pair of spaced guide plates 202 are positioned between roller 190 and pickup rollers 200 for the purpose of stripping and guiding transfer sheets 152 from vacuum roller 190 into the nip presented between the pickup rollers 200. A collection tray 204 is positioned adjacent the exit face of the nip between pickup rollers 200 for the purpose of collecting the used transfer sheets 152.

When a candle body 52 having a transfer sheet wrapped thereabout enters station 30, pick-up structure 178 is actuated to lift the same off cradles 36 and into engagement with vacuum stripping rollers 190 as depicted in FIGS. 10 and 11. At this point, a vacuum is drawn through roller 190 and the latter is rotated which in turn causes rotation of the candle body 52 by virtue of the pressurized engagement between the latter and vacuum roller 190 afforded by pressure rollers 188.

As rotation thus proceeds, the vacuum drawn through roller 190 initially causes tab 170 to separate from the underlying portion of sheet 152, whereupon the latter is progressively stripped from candle body 52. Thus, as roller 190 rotates, sheet 152 is continually stripped from body 52 and advanced closer to lower guide plate 202 which is in lightly touching, generally tangential engagement with roller 190. The engagement between lower guide plate 202 and roller 190 tends to strip sheet 152 from the latter and advance the same into the nip between driven pickup rollers 200. Upon reaching this nip area, sheet 152 is pulled completely from roller 190 and delivered to collection tray 204. At this point, the stripped, decorated candle body 52 is lowered onto cradles 36 therefor, and conveyor 32 is advanced to deliver the finished candle 52 to delivery ramp 206 (see FIG. 1).

As indicated above, it was discovered during development of the present invention that most desirable results from an aesthetic and economic viewpoint are attained when commercial scale gravure or lithographic processes are employed. This results from the fact that these techniques permit commercial scale printing of halftone or shaded design images without the necessity of utilizing costly precision equipment as is the case with sophisticated silk screening processes or the like. However, typical gravure and lithographic printing is difficult with waxed paper sheets because of the fact that when conventional inks are used therewith, the images does not adequately adhere to wax to assure prompt drying thereof and freedom from offset.

In this connection, it has been found that specific novel ink formulations can be utilized to good advantage, especially in the gravure printing of waxed paper sheets. In general, such formulations preferably include about 2 to 55% by wieght standard ink pigment; about 15 to 30% by weight alcohol insoluble maleic ester resin binder; about 1 to 4% hard modified microcrystalline wax having a melting point in the range of from about 160° to 260° F; and about 1 to 4% by weight of a cellulose ether ester. The balance (at least 30%) of the ink comprises a solvent capable of solubilizing the resin binder and cellulose ether ester. With regard to the latter, it is essential that the solvent employed be incapable of significantly solubilizing the wax on the waxed sheet.

The selection of solvent in the above described ink formulations is especially important because if the solvent acts to liquefy or solubilize the wax on the waxed sheet, the initially wet ink deposited in the printing process can liquefy the wax which in turn causes smearing and/or wax encapsulation of liquid ink. This is an objectionable result not only because of the smeared design image which results, but because ink-drying times are considerably lengthened thereby. As can be appreciated, the relatively long drying times required with inks having solvents therein capable of solubilizing the wax on the paper substrates could preclude commercial scale printing of the waxed sheets by virtue of the fact that they could not be stacked as successively printed because of the problem of offsetting therebetween.

In this connection, the following solvents have been found to be particularly useful: butyl acetate; isopropyl acetate; ethyl acetate; ethylene glycol monoethylether acetate; nitromethane; nitroethane; nitropropane; 2-nitropropane; methyethylketone; and acetone or mixtures thereof. In other further preferred embodiments, the solvent can also contain an alcohol selected from the group consisting of ethyl, isopropyl, n-propyl and butyl alcohol.

It will also be apparent to those skilled in the are that the particular quantities of constituents within the above defined ranges depends chiefly on the color, viscosity, and drying characteristics required in the finished inks. In particular, the following ink formulations have been found to be particularly advantageous for gravure printing on waxed paper sheets, because they have the correct viscosity and drying characteristics while nevertheless giving the required color effects:

EXAMPLE I

In producing a blue ink having the proper adherence, evaporative and solubilizing properties, the following formulation was prepared:

10% Morastral Blue GF BT-417-D
25% Unirez 7028
2% Polymekon wax
2% EHEC
61% butyl acetate The pthalo blue pigment employed was supplied by E. I. Du Pont de Nemours and Company of Wilmington, Del. Other operable pigments utilized include Hostasperm Blue B 3G-50 sold by American Hoescht Company and Cyan Blue GTNF, Code 55-3450, sold by the American Cyanamid Company of New York, N.Y.

unirez 7028 is a modified alcohol insoluble maleic resin sold by the Union Camp Chemical Company of Jacksonville, Fla. It is present in the above ink in order to facilitate adherence of the pigment to the waxed sheet after the solvent has evaporated.

Polymekon wax is a hard modified microcrystalline wax sold by the Western Petrochemical Corporation of Chanute, Kansas. The wax has a drop melting point (ASTM) of from 200° to 225° F. and is present in the ink formation in order to impart a degree of scuff and smear resistance to the ink when deposited.

EHEC is ethylhydroxyethylcellulose and is utilized as a viscosity conrol agent. EHEC is a conventional cellulose ether ester which can be obtained from the Hercules Chemical Co. of Wilmington, Del. Likewise, butyl acetate solvent is commercially available from many sources.

It is to be understood that when ink formulations as described are admixed, they exhibit a relatively high viscosity from 200 to 2000 centipoises, depending principally upon the relative amounts of EHEC and solvent employed. However, before printing with such inks with gravure or offset techniques, it is desirable to dilute the same with solvents of the class described which are incapable of significantly solubilizing the wax on the sheets to be printed. These dilutions are for the purpose of decreasing the viscosity of the ink to a level usable in printing processes chosen (e.g., 5–20 cps for gravure) and the techniques employed to adjust this viscosity level are well known to those skilled in the printing art. It is important however that the solvent used in the dilution not have the objectionable property of solubilizing the wax on the transfer sheets to be printed.

The following ink formulations are exemplary of different colors obtainable, and all have been tested and found to be especially useful for purposes of the present invention:

I

8% Hostaperm Yellow 11-1003[1]
25% Unirez 7028
2% Polymekon wax
2% EHEC
63% butyl acetate

[1] sold by American Hoescht Company

II

25% Sun Rhodamine B-21t01[2]
25% Unirez 7028
2% Polymekon wax
2% EHEC
46% butyl acetate

[2] sold by Sun Chemical Company, Pigments Division, Cincinatti, Ohio

III

45% Saturn Yellow T 17[3]

18% Unirez 7028
1.5% EHEC
2% Polymekon wax
33.5% butyl acetate

[3] sold by Da-Glo Corporation of Cleveland, Ohio

It has been found that in the processes of the present invention the waxed transfer sheet should preferrably be glassine or other paper (most preferably 2.4 mils thick) which is coated on both sides with wax similar to that of conventional candle bodies and having a melting point in the range of from about 125° to 140° F. Such waxed transfer sheets have been found to be particularly advantageous when printed upon using inks in accordance with the invention in a gravure process.

Having thus described the invention, what is claimed as new and desired to be secured by letters Patent is:

1. A method of transferring a design image to a wax article comprising the steps of:

providing a series of individual transfer sheets each having an external coating of heat meltable wax on opposite faces thereof;

gravure imprinting a shaded or half tone design image in ink on one waxed surface of each of said sheets, said ink being capable of adhering to said waxed surface;

wrapping an imprinted sheet about a respective wax article in closely conforming relationship thereto with said design image facing said article, each of said sheets having a dimension in the direction of wrap thereof around a corresponding article at least equal to the circumscribing dimension of the article in such direction, and said image being of dimensions to substantially abut end to end when a sheet with said image thereon is wrapped about a respective article;

applying sufficient heat and pressure to the sheet while wrapped around the article to melt the wax surface carrying said image to an extent to effect transfer of wax supporting said design image to the wax article;

lowering the temperature of the design supporting wax layer transferred to the article to a level to cause such wax to firmly adhere to the article in covering relationship to said design with the latter firmly affixed to the article; and stripping said sheet from said wax article.

2. The method as set forth in claim 1, including the step of employing a waxed transfer sheet comprising a sheet of paper having at least one side thereof coated with wax having a melting point in the range of from about 125° to 140° F.

3. The method as set forth in claim 1 wherein the step of gravure imprinting said design image onto said sheet involves utilization of ink having solvents therein capable of significantly solubilizing the wax on said sheet and being characterized by remaining sufficiently fluid during said gravure printing to permit transfer to said sheet but being sufficiently quick-drying to preclude offset between successively imprinted sheets.

4. The method as set forth in claim 3, including the step of employing gravure ink comprising about 2 to 55% by weight pigment, about 15 to 30% by weight alcohol insoluble maleic ester resin binder, about 1 to 4% by weight hard modified microcrystalline wax having a melting point in the range of from about 160° to 260° F., about 1 to 4% by weight of a cellulose ether ester, and about 30 to 80% by weight of solvent capable of solubilizing said resin binder and cellulose ether ester, but which does not significantly solubilize the wax on said wax sheet.

5. The method as set forth in claim 4, including the step of employing ink having therein ethylhydroxyethylcellulose as said cellulose ether ester, said solvent being selected from the group consisting of butylacetate, isopropyl acetate, ethyl acetate, ethylene glycol monoethylether acetate, nitromethane, nitroethane, nitropropane, 2-nitropropane, methyethylketone, acetone and mixtures thereof.

6. The method as set forth in claim 5, wherein said solvent also contains an alcohol selected from the group consisting of ethyl, isopropyl, n-propyl and butyl alcohol as a constituent thereof.

7. The method as set forth in claim 5, including the step of employing ink utilizing butyl acetate as solvent therein.

8. The method as set forth in claim 1, wherein said wax article is an elongated, cylindrical candle body and said sheet is wrapped thereabout by placing said candle in bridging contact with a pair of spaced, adjacent, axially rotating cylindrical rollers, and inserting said sheet in the nip formed at the juncture between one of said rollers and said candle body, whereby said sheet is progressively wrapped about the candle body in closely conforming relationship thereto.

9. The method as set forth in claim 8, including the step of providing freely rotatably pressure means bearing against a section of said candle body remote from said rollers for pressing the candle body into pressurized bridging engagement with the same.

10. The method as set forth in claim 8, including the step of heating said one roller to a temperature sufficient to effect transfer of said design image onto said candle body.

11. The method as set forth in claim 9, including the step of employing a sheet of width such that when wrapped about said candle body, an elongated tab portion of the sheet overlaps the initial leading edge thereof in contact with the candle body.

12. The method as set forth in claim 11, including the step of using selectively actuatable vacuum means for selectively grasping said elongated tab portion to progressively strip said sheet from said candle.

13. The method as set forth in claim 8, wherein is included the steps of removing surface irregularities from said candle body prior to wrapping the sheet therearound by placing the body in pressurized, bridging contact between another pair of spaced, adjacent, axially rotating cylindrical rollers, one of said other pair of rollers being heated to a level sufficient to soften the peripheral surface of said candle body, and cooling said candle body to effect complete hardening of said surface.

14. The method as set forth in claim 13, wherein is included the steps of cooling said candle body by spraying cooling water onto the same, whereupon said candle body is air dried to strip substantially all water therefrom.

* * * * *